3,370,057
LEUROSINE
Gordon H. Svoboda, Indianapolis, Ind., assignor to Eli Lilly and Company, Indianapolis, Ind., a corporation of Indiana
Continuation-in-part of applications Ser. No. 43,499, July 18, 1960, and Ser. No. 129,567, Aug. 7, 1961. This application Apr. 27, 1964, Ser. No. 369,340
1 Claim. (Cl. 260—236)

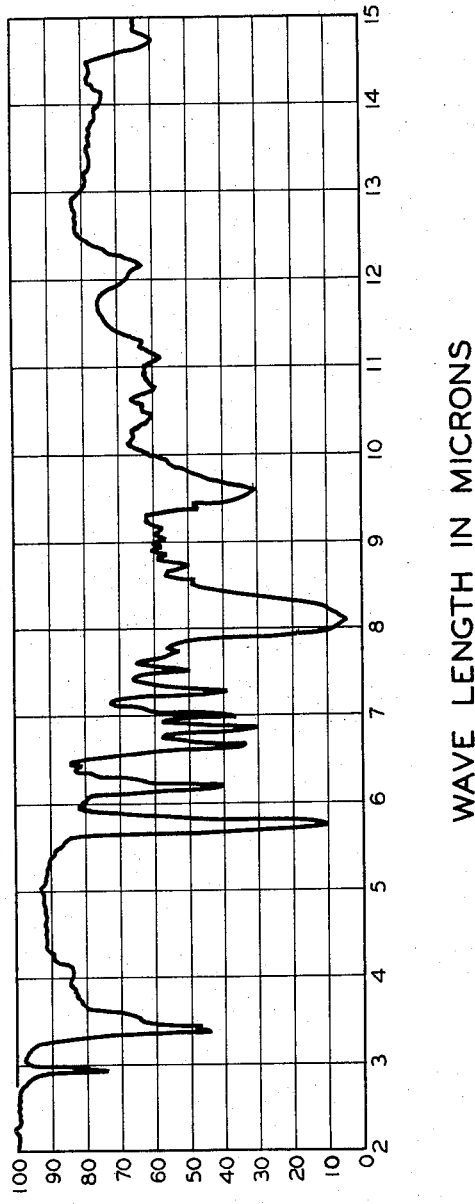

This is a continuation-in-part of my copending U.S. patent application Ser. No. 43,499, filed July 18, 1960 (which was a continuation-in-part of my U.S. application Ser. No. 756,761, filed Aug. 25, 1958, and of my copending application Ser. No. 129,567, filed Aug. 7, 1961 all three now abandoned.

The invention described and claimed herein relates to a novel substance, and to methods for its preparation and purification.

The novel substance provided by this invention is denominated leurosine, and is obtained from certain plants belonging to the family Apocynaceae. It is a white, crystalline, weakly-basic, nitrogen-containing compound which decomposes on heating at about 200–205° C.

Leurosine is soluble in most of the common oxygenated organic solvents, such as acetone, alcohol, ethyl acetate, etc., as well as in aromatic hydrocarbon solvents, such as benzene and toluene, and in chlorinated aliphatic solvents such as chloroform and ethylene dichloride. Leurosine is, however, insoluble in aliphatic hydrocarbon solvents on the one hand and water on the other. Leurosine is a weakly basic substance and hence is soluble in dilute acid solution, but is relatively unstable in such solutions, especially in mineral acid solutions having a low pH.

Leurosine crystallizes from water-containing solvents in the form of a hydrate containing eight molecules of water. The hydrate is somewhat unstable and loses its water of hydration on standing. The anhydrous crystalline form of leurosine, however, which can be obtained from the hydrate by drying at an elevated temperature in vacuo appears to be relatively stable.

As with other weak bases which are alkaloidal in nature, leurosine gives a creamy white precipitate with Mayer's reagent, an orange color with Dragendorff's reagent, a yellow color with the Van Urk reagent, and a pink color with ceric ammonium sulfate dissolved in syrupy phosphoric acid.

IDENTIFICATION OF LEUROSINE

Leurosine can be readily identified by its characteristic physical properties, the most decisive of which are set forth below:

(1) Electrometric titration of leurosine in acidic solution reveals the presence of two titratable groups with $pK_a' = 5.5$ and $7.5$.

(2) Elemental analyses of leurosine on samples which were thoroughly dried prior to analysis gave the following elemental percentages:

|  | Percent |
|---|---|
| Carbon | 68.11 |
| Hydrogen | 7.30 |
| Nitrogen | 7.10 |
| Oxygen | 17.34 |

(3) The molecular weight of leurosine octahydrate, as determined by X-ray data, is about 955, giving a weight for leurosine of about 809. These data establish the following empirical formula for leurosine: $C_{46}H_{58}O_9N_4$.

(4) Analyses for various groups in leurosine were as follows:

|  | Percent |
|---|---|
| C-methyl | 4.91 |
| Methoxyl | 15.31 |
| N-methyl | 1.43 |

These values, when taken in connection with the above molecular weight, indicate that each molecule of leurosine contains one C-methyl group, four methoxyl groups, and one N-methyl group.

(5) The ultraviolet absorption spectrum of an ethanol solution of leurosine octahydrate shows maxima at 214 and 259 m$\mu$ with shoulders at 288 and 296 m$\mu$ and a minimum at 246 m$\mu$, the maxima having molecular extinction coefficients of 575 and 175, respectively.

(6) Leurosine octahydrate has the following specific rotation in chloroform solution:

$$[\alpha]_D^{36°} = +72° \ (c.=1)$$

(7) The infrared absorption spectrum, over the range from 2 to 15 microns of a chloroform solution of leurosine octahydrate, is presented in the accompanying drawing. The infrared absorption spectrum exhibits characteristic absorption maxima at the following wave lengths (expressed in microns): 2.90, 3.35, 3.40, 3.50, 5.74, 6.18, 6.65, 6.85, 6.97, 7.28, 7.50, 7.73, 8.1, 8.64, 8.72, 8.83, 8.92, 9.02, 9.15, 9.40, 9.59, 10.21, 10.41, 10.56, 10.75, 10.88, 11.10, 11.28, and 12.17.

Two additional absorption maxima can be detected in the infrared region of the spectrum at 8.06 and 8.7 microns when carbon disulfide is employed as the solvent. The peaks in this region are obscured when chloroform is used as the solvent because of the strong absorption of chloroform in this region of the spectrum.

(8) Leurosine can be further characterized by paper chromatographic methods. For such characterization, a paper treated with phosphate buffer is used, and the developing solvent is either isobutanol saturated with water or n-amyl alcohol saturated with water. The treated paper is prepared as follows: A suitable paper (Whatman No. 1 paper) is dipped in a buffer prepared from 60 g. of fresh potassium hydroxide pellets dissolved in about 800 ml. of water to which are added 60 ml. of concentrated phosphoric acid in 100 ml. of water. The pH of the buffer is adjusted to 3.0 by the addition of phosphoric acid, about 10 ml. usually being sufficient, and water is added to make one liter of buffer solution. The paper is dipped in the buffer solution, and is then laid on blotting paper and allowed to dry for about 16 hours at ambient room temperature.

The leurosine-containing solution is spotted at the origin of a strip of paper prepared as above, and the paper is placed in a standard chromatographic chamber in which the air is saturated with respect to both components of the solvent system. The chromatographic pattern is developed for about 24 hours at about 74° F. The presence of leurosine is detected either by scanning the paper with low wave length ultraviolet light or by applying Dragendorff's reagent to the paper. Dragendorff's reagent is prepared according to the procedure of Thies and Reuther, Naturwissenschaften, vol. 41, page 230 (1954), and vol. 42, pages 462 and 487 (1955). In short wave length ultraviolet light, leurosine appears as a dark spot with very slight fluorescence; and with Dragendorff's reagent, leurosine appears as a red-orange spot on a yellowish-orange background. The $R_f$ value of leurosine, as determined by means of the above procedure, is 0.51 in an isobutanol-water solvent system using the phosphate-buffered paper, and 0.28 in an n-amyl alcohol-water solvent system.

(9) Thin layer chromatography can also be used to identify leurosine and thus to signify its presence or absence in various plant extracts. In carrying out this chromatographic procedure a thin layer of fluorescent (activated with zinc sulfide) silica gel is slurried with 0.5 N lithium hydroxide, deposited as a thin layer on glass, and the resulting glass with its layer of silica is dried. A solution containing 12 mg. per ml. of leurosine is prepared in chloroform and 20λ of this solution is spotted on the thin layer at the origin, and the thin layer is then placed in a standard jar. The developing solvent contains 15 parts of diethylamine, 100 parts of chloroform,, and 200 parts of benzene. The development of the chromatogram can be followed by short wave length ultraviolet light. After the chromatogram has been developed sufficiently, the plate containing the thin layer is removed from the chamber and dried. The spot corresponding to leurosine can be detected by use either of ultraviolet light or of the abovementioned reagent comprising ceric ammonium sulfate in syrupy phosphoric acid.

In general, vincaleukoblastine is the only alkaloid which runs with leurosine through most chromatographic systems. The above procedure, however, is quite satisfactory for the separation of these two alkaloids.

(10) Leurosine octahydrate crystallizes in the monoclinic system with unit cell dimensions as follows:

$a_0 = 26.64$, $b_0 = 9.28$, $c_0 = 15.90$,
$\beta = 97°10'$

(11) The specific gravity of crystalline leurosine octahydrate is 1.262.

(12) A powder X-ray diffraction pattern using unfiltered chromium radiation and a wave length value of 2.2896 A. in calculating the interplanar spacing, gives the following values:

TABLE I.—X-RAY POWDER DIFFRACTION DATA

| Interplanar Distance in A. | Relative Intensity | Interplanar Distance in A. Calculated From Unit Cell Dimensions |
|---|---|---|
| 15.8 | .50 | 15.78 |
| 13.4 | .40 | 13.21 |
| 11.0 | .50 | 10.82 |
| 9.81 | .20 | 9.56 |
| 9.29 | .20 | 9.28 |
| 8.77 | .05 | 8.76, 8.81 |
| 8.10 | 1.00 | 8.11, 8.00 |
| 7.18 | .50 | 7.18 |
| 6.59 | .75 | 6.61 |
| 6.34 | .20 | 6.38 |
| 6.09 | .20 | 6.01 |
| 5.47 | .10 | 5.56 |
| 5.25 | .30 | 5.26, 5.29 |
| 4.94 | .05 | 4.94 |
| 4.73 | .10 | 4.77, 4.77, 4.78, 4.70 |
| 4.61 | .30 | 4.64, 4.69 |
| 4.13 | .05 | 4.12, 4.16, 4.11 |
| 4.03 | .05 | 4.06 |
| 3.93 | .10 | 3.95, 3.90 |
| 3.76 | .10 | 3.78, 3.78 |
| 3.66 | .05 | 3.66, 3.66, 3.63 |
| 3.51 | .05 | 3.52 |
| 3.38 | .05 | 3.41, 3.40 |
| 3.33 | .05 | 3.35, 3.37 |
| 3.17 | .05 | 3.19, 3.19 |

PREPARATION OF LEUROSINE

The plant sources from which leurosine can be obtained are those belonging to the family Apocynaceae, and particularly the genus Vinca. Especially productive sources include *Catharanthus roseus*, also popularly known as *Vinca rosea* or *Lochnera rosea* and *Catharanthus lanceus* or *Vinca lancea*. The recovery of leurosine therefrom is conveniently carried out by the following procedure:

The plant source, in the form of either the whole plant or its leaves, is dried and ground to a powder, which is then wetted with a solution of an organic acid in water, said solution having a pH in the range 2 to 3. The wetted crude drug is extracted with benzene, and the benzene extract is separated and concentrated by evaporation in vacuo to a workable volume. An aqueous solution of an organic acid is then added to this concentrate and the remaining benzene is removed therefrom by steam distillation under reduced pressure, yielding an acidic solution of alkaloidal material having in suspension essentially non-alkaloidal material. The suspended solids are separated by filtration. The acidic layer is next extracted with ethylene dichloride to remove inactive alkaloidal impurities. The acidity of the aqueous phase is then adjusted to a pH in the range 7.5 to 8.5, preferably using ammonium hydroxide. Contacting the now alkaline layer with ethylene dichloride serves to extract the active alkaloids into the organic layer. The ethylene dichloride layer is separated and dried and the ethylene dichloride removed by evaporation in vacuo. The resulting residue is dried and is then dissolved in benzene, and chromatographed over an alumina column to separate the leurosine from companion alkaloids. Purified leurosine is eluted from the column with a benzene-chloroform solvent mixture, after less polar alkaloids have been eluted with benzene or ether or other relatively non-polar solvents.

Leurosine, as such, does not appear to exist in the plant or in the crude extracts of the prior art, since it has not been possible to demonstrate its existence in such extracts by means of paper strip chromatography or thin layer chromatography using very sensitive color reagents.

Leurosine is useful in the study of the origin and mechanism of cancer, since it inhibits the growth of various transplanted tumors in mice, particularly transplanted leukemias. Table II, which follows, sets forth the tumor spectrum of leurosine in mice against various transplanted leukemias and ascites tumors.

TABLE II.—COMPOSITE RESULTS OF TUMOR SPECTRA STUDIES WITH LEUROSINE

| Strain | Dosage in mg./kg. | No. of Doses | Prolongation, Percent |
|---|---|---|---|
| Leukemias | | | |
| P-1534 | 30.00 | 10 | 20 |
| P-1534 | 9.38 | 10 | 68 |
| P-1534 | 30.00 | 3 | 145 |
| L-1210 | 30.00 | 10 | 21 |
| L-1210 | 3.75 | 10 | 20 |
| L-1210 | 12.60 | 3 | 33 |
| Friend | 30.00 | 10 | 36 |
| B8ZA | 30.00 | 10 | 56 |
| B8ZA | 9.28 | 10 | 0 |
| AKR | 30.00 | 10 | 35 |
| AKR | 9.38 | 10 | 0 |
| Ascites Tumors | | | |
| Ehrlich | 3.75 | 10 | 53 |
| Freund | 3.75 | 10 | 41 |
| S-180 | 3.75 | 10 | [1] 94 |

[1] 3 survivors.

Leurosine also inhibits the growth of two transplanted solid tumors; viz., Sarcoma 180 in mice, where a dose of 10.5 mg./kg. on each of 10 successive days gives 35% inhibition of the tumor; and Walker carcinoma 265 in rats, where a dose of 15 mg./kg. on each of 10 successive days gives a 49% inhibition of the tumor.

As can be seen from Table II above, leurosine is quite effective in prolonging the life of experimental animals in which leukemias and ascites tumors have been transplanted. Its spectrum of activity is substantially different from that found with either vincaleukoblastine (vinblastine), leurocristine (vincristine), or leurosidine (vinrosidine), as well as with derivatives of these oncolytic alkaloids. This difference in oncolytic activity among the various Vinca alkaloids reflects a difference in chemical structure. Thus, leurosine, in company with other Vinca alkaloids which are perhaps not sufficiently active ever to meet the criteria established for marketing as a remedy against malignancies in humans, is nevertheless extremely useful in pointing out to those skilled in the art the minimal structural requirements for the inhibition of transplanted tumors among these substances. Thus, knowledge of the structure of leurosine and of its anti-tumor activity can aid materially in the preparation of more active compounds on the one hand, and in furthering the knowledge of the mitotic process in malignant cells on the other.

In addition to the above utilities, leurosine can be transformed to various other compounds, some of which have also shown oncolytic activity in experimental tumors in mice, as for example, leurosine methiodide and related quaternary nitrogen derivatives.

The following procedures illustrate methods of obtaining leurosine from plant sources.

*Example I*

1500 g. of dried ground plant of *Vinca rosea* were intimately mixed with 1000 ml. of a 2 percent tartaric acid solution, and the mixture was extracted with three 9-liter portions of benzene. The benzene extracts were combined and were concentrated in vacuo to about 1500 ml. The concentrate was mixed with one liter of 2 percent tartaric acid and the mixture was steam-distilled under reduced pressure until all of the benzene had distilled over. The precipitate produced thereby was separated from the aqueous phase and dissolved in hot methanol, a second 1-liter portion of 2 percent tartaric acid solution was added, and the mixture was steam-distilled under reduced pressure until all the methanol had distilled. The two tartaric acid solutions from the steam distillations were combined and washed with three 1-liter portions of ethylene dichloride, which were discarded. The washed aqueous phase was brought to a pH of about 8.5–9.5 by the addition of 28 percent aqueous ammonium hydroxide, and was extracted with three 1-liter portions of ethylene dichloride. The ethylene dichloride extracts were combined, were dried, and were evaporated in vacuo, yielding a residue of 3.35 g. of a light brown powder.

1.5 g. of the residue were dissolved in 10 ml. of benzene, and the solution was passed over a chromatographic adsorption column containing 50 g. of alumina (Alcoa activated alumina, Grade F–20 obtainable from The Aluminum Company of America, Pittsburgh, Pa.) which had previously been shaken for about 20 minutes with a mixture of 100 ml. of benzene containing 1.5 ml. of 10 percent acetic acid.

The column was developed by washing it with 2100 ml. of benzene. The column was then washed sequentially with 300 ml. of benzene-chloroform solvent (95:5 by volume) and 800 ml. of benzene-chloroform solvent (75:25) to remove indeterminate impurities. The leurosine was eluted from the alumina by passing over the column 900 ml. of benzene-chloroform solvent (50:50). The eluate was evaporated to dryness in vacuo, leaving an amorphous residue of 113 mg. of leurosine. The residue was treated with a few ml. of methanol in which it quickly dissolved, but from which it quickly precipitated in crystalline form. Because of the affinity of leurosine for water, and the presence of traces of water in the solvents, the leurosine was obtained in the form of its octahydrate. Although the material as obtained was substantially pure, it was further purified by recrystallizing it from hot methanol solution. The hydrated leurosine obtained decomposed at about 200–205° C.

Anhydrous leurosine was obtained by heating the hydrated material in an Abderhalden drier at 130° C. over phosphorus pentoxide for about 3 hours. The anhydrous leurosine decomposed at about 200–205° C.

*Example II*

9 kg. of ground, dried, whole *Vinca Rosea* plants were defatted by stirring with two 45-liter portions of hexane and then discarding the hexane extracts. The defatted solids were moistened with 6 liters of aqueous 2 percent tartaric acid solution and were extracted by stirring with three successive 48-liter portions of benzene. The benzene extracts were combined and were concentrated in vacuo to a volume of about 9 liters. To the concentrate were added 12 liters of aqueous 2 percent tartaric acid solution, and the organic solvent was removed by steam distillation under reduced pressure, during which operation the leurosine and vincaleukoblastine dissolved in the aqueous acid layer in the form of their tartrate salts. Acid-insoluble material was separated by filtration. The filter cake was dissolved in methanol, 12 liters of aqueous 2 percent tartaric acid solution were added, and the above steam distillation procedure was repeated. The tartaric acid layer was filtered to remove undesirable insoluble material and the filtrate was combined with the previous tartaric acid filtrate. The combined filtrates were extracted with two 6-liter portions of ethylene dichloride. Tetrahydroalstonine, vindoline, and related alkaloids were extracted into the ethylene dichloride and were thus separated from the leurosine and vincaleukoblastine. The acidic aqueous solution was then made alkaline to litmus with ammonium hydroxide. Extraction of the ammoniacal solution with 6 liters of ethylene dichloride removed the weakly basic alkaloid fraction containing leurosine and vincaleukoblastine. Evaporation of the ethylene dichloride extract to dryness yielded about 20 g. of amorphous alkaloids. 10 g. of this residue were dissolved in benzene and the benzene solution was subjected to a preliminary chromatographic separation using as the solid phase 400 g. of alumina (Alcoa alumina, grade A–20) which had previously been deactivated by treatment with 12.5 ml. of 10 percent acetic acid. Elution was carried out with a series of solvents, as set forth below in Table III, the volume of each chromatographic fraction being arbitrarily set at 500 ml. Table III sets forth the results of the chromatographic separation procedure. In the table, column 1 gives the number of the fraction, column 2 the eluting solvent, and column 3 the major alkaloid obtained from that fraction.

TABLE III

| Fraction | Eluting Solvent | Alkaloid |
| --- | --- | --- |
| 1 | Benzene | Catharanthine. |
| 2 | ....do | Vindolinine.[1] |
| 3–19 | ....do | Ajmalicine. |
| 20–21 | ....do | Vindoline. |
| 34–42 | Benzene-chloroform (1:1) | Leurosine. |
| 43–45 | ....do | Vincaleukoblastine.[2] |

[1] Crystallized as the dihydrochloride salt.
[2] Crystallized as the sulfate salt.

I claim:
1. Leurosine, a crystalline, weakly basic, nitrogen-containing compound having a molecular weight of 809 and showing upon analysis the presence of 68.11 percent carbon, 7.30 percent hydrogen, 7.10 percent nitrogen, and 17.34 percent oxygen, the said values establishing the empirical formula $C_{46}H_{58}O_9N_4$; having an N-methyl group content of 1.43 percent, a C-methyl group content of 4.91 percent, and a methoxyl group content of 15.31 percent; showing $pK_a'$ values in water of 5.5 and 7.5; its octahydrate having ultraviolet absorption maxima at 214 and 259 m$\mu$ with shoulders at 288 and 296 m$\mu$, and a minimum at 246 m$\mu$, the maxima having molecular extinction coefficients of 575 and 175, respectively; its octahydrate exhibiting in a chloroform solution in the infrared region over the range of about 2 to about 15 microns, characteristic peaks at 2.90, 3.35, 3.40, 3.50, 5.74, 6.18, 6.65, 6.85, 6.97, 7.28, 7.50, 7.73, 8.1, 8.64, 8.72, 8.83, 8.92, 9.02, 9.15, 9.40, 9.59, 10.21, 10.41, 10.56, 10.75, 10.88, 11.10, 11.28 and 12.17 microns; its octahydrate having the following specific rotation in chloroform solution: $[\alpha]_D^{36°} = +72°$ (c.=1); having a decomposition point in the range 200–205° C.; its octahydrate having a specific gravity of 1.262; and its octahydrate crystallizing in the monoclinic system with the following unit cell dimensions: $a_0 = 26.64$, $b_0 = 9.28$, $c_0 = 15.90$, $\beta = 97°10'$.

(References on following page)

References Cited

Johnson et al.: Cancer Research, vol. 20 (August 1960), pp. 1016-22.

Hodes et al.: Cancer Chemotherapy Reports (April 1963), p. 53.

Beer British Empire Cancer Campaign, 33rd Annual Rept. (1955), p. 487.

Svoboda, Jour. Amer. Pharmaceut. Ass'n, vol. 47 (1958), p. 834.

Hertz Proc. Soc. Ex. Biol. and Med., vol. 105 (1960), p. 281.

JAMES A. PATTEN, *Primary Examiner.*

WALTER A. MODANCE, JOHN D. RANDOLPH,
*Examiners.*